April 7, 1953   R. S. FARR   2,633,929
APPARATUS FOR FILTERING AIR
Filed Aug. 24, 1948   2 SHEETS—SHEET 2
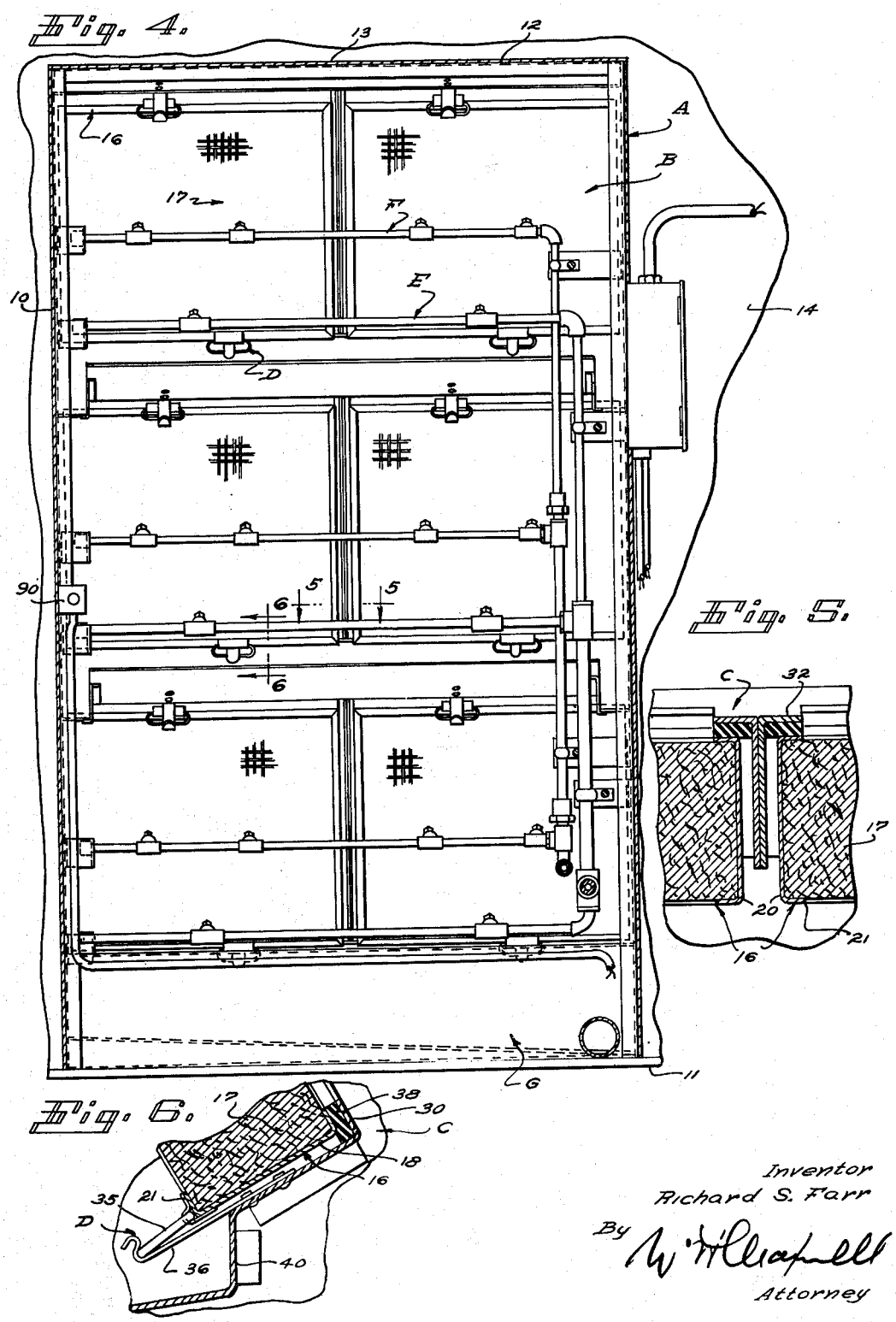
Inventor
Richard S. Farr
By
Attorney Patented Apr. 7, 1953

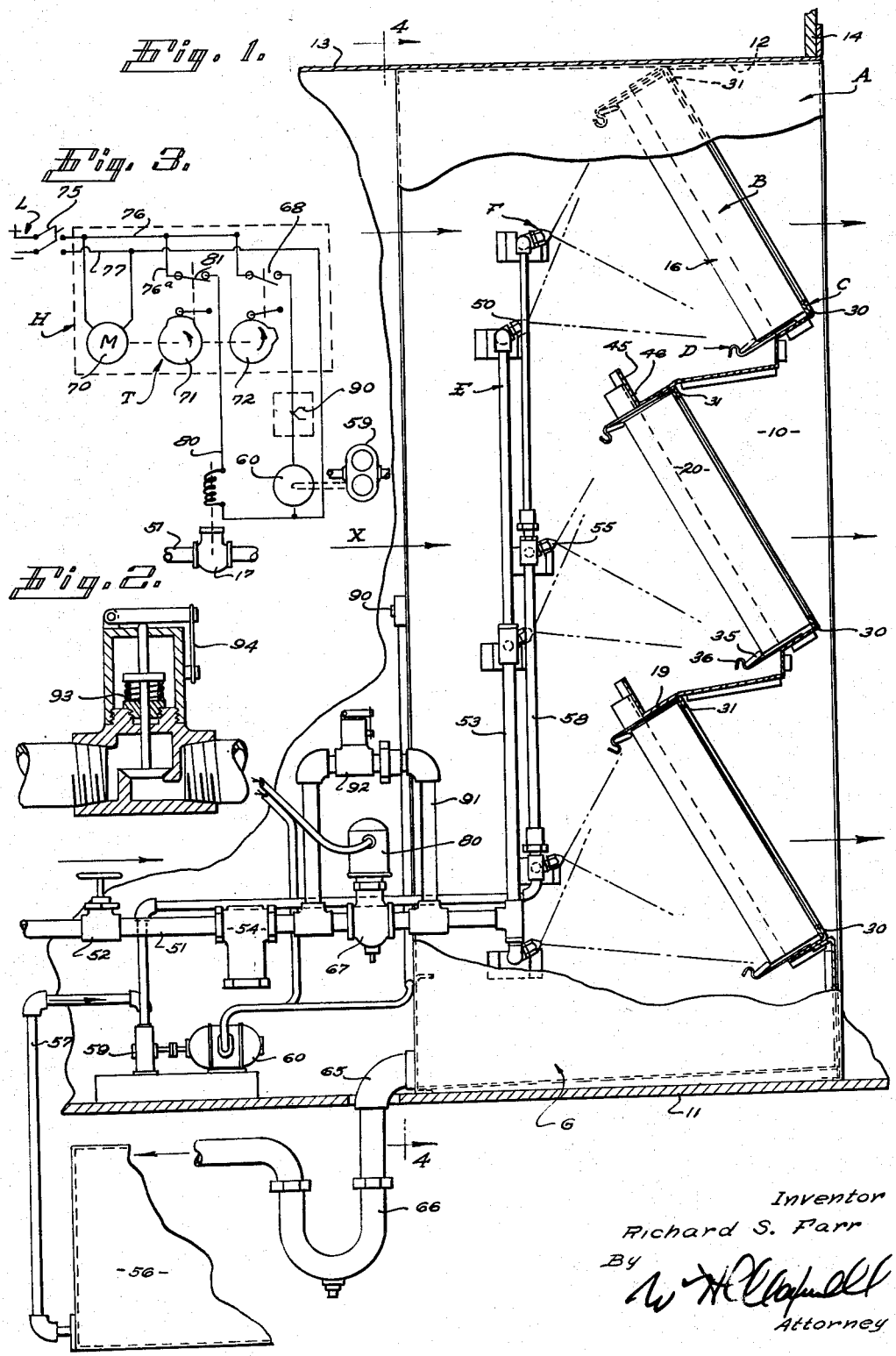

2,633,929

UNITED STATES PATENT OFFICE 2,633,929

APPARATUS FOR FILTERING AIR

Richard S. Farr, Los Angeles, Calif., assignor to Farr Company, Los Angeles, Calif., a corporation of California Application August 24, 1948, Serial No. 45,936

14 Claims. (Cl. 183—52)

This invention relates to apparatus for filtering air and it is a general object of the present invention to provide such apparatus with a unique effective and improved arrangement of parts and with means whereby the filter parts may be washed at intervals and then reconditioned by the application of a filtering agent thereto.

It is a general object of the present invention to provide an air filter including a housing through which air is circulated and an arrangement of filter units in such housing whereby a high percentage of the available area of the passage is utilized in filtering action.

Another object of the invention is to provide a structure of the general character referred to in which filter elements are periodically washed, allowed to dry and then re-established in condition for effective filtering action. The structure may be adjustable so that the cycle of operation is set to most effectively handle the conditions encountered.

Another object of the invention is to provide apparatus of the general character referred to wherein filter units are so related and disposed in an air duct as to receive liquid at one side, as from a nozzle, without such liquid passing through the filter units in a manner to discharge there beyond.

Another object of the present invention is to provide apparatus of the general character referred to with nozzles for spraying a cleaner onto the filter units and also for spraying a filter agent, as for instance oil, onto the filter units and including a control system governing the action of the apparatus so that the cleaning fluid is applied to the filter units intermittently, followed by an application of oil to the filter units.

A further object of the invention is to provide apparatus of the character referred to including a drain that may be connected to a sewer or other outlet serving to dispose of the matter washed from the apparatus.

Another object of the present invention is to provide apparatus of the general character referred to wherein thermal controls are included so that material such as oil is not delivered to the filter units in the event that excessive temperature conditions prevail.

Another object of the present invention is to provide apparatus of the general character referred to wherein thermal control means is provided regulating a fire extinguishing medium so that the danger of fire occurring in or being fed by the materials in the apparatus is minimized.

Another object of the invention is to provide a structure of the general character referred to wherein the oil used in or on the filter units may be stored at a point remote from the other parts of the apparatus thus minimize fire hazard.

The various objects and features of my invention will be fully understood from the following detailed description of a typical preferred form and application of the invention, throughout which description reference is made to the accompanying drawings, in which:

Fig. 1 is a vertical longitudinal sectional view of apparatus embodying the present invention showing the general arrangement and relationship of parts provided by the invention. Fig. 2 is an enlarged detailed sectional view of a thermostatically controlled valve included in the apparatus. Fig. 3 is a diagrammatic view illustrating the electric control circuit and illustrating the manner in which the electric circuit is related to the principal control elements employed in the apparatus. Fig. 4 is a transverse sectional view taken as indicated by line 4—4 on Fig. 1. Fig. 5 is an enlarged detailed plan view taken as indicated by line 5—5 on Fig. 4, and Fig. 6 is an enlarged detailed sectional view taken as indicated by line 6—6 on Fig. 4.

The apparatus including the present invention involves, generally, a housing A defining or establishing a duct through which air is circulated, filter means in the housing preferably established by a plurality of like filter units B, a support C mounting or carrying the filter units B in the housing A, retaining means D for the filter units B releasably retaining them in operating position carried by the support C, means E supplying a cleaning or washing fluid to the filter units, means F supplying a filter agent to the filter units, a catch basin G located to receive fluids draining from the filter units and a control system H controlling the action of the means E and F.

The housing A is a frame-like element and in practice may be shaped and proportioned to accommodate structural elements with which the apparatus is to be used or combined. In the drawings the housing A is shown as including sides 10 extending upwardly from a base or floor 11 and a top 12 extending between the upper ends of the sides. The top is shown fitted beneath a horizontally disposed partition 13 and the housing is shown located adjacent a vertical partition 14. The housing forms a passage or duct through which air is circulated in the direction indicated by the arrow X in Fig. 1. It is to be understood that the air may be circulated by any suitable means, that is through natural draft or by air circulating means entirely independent of the apparatus of the present invention.

The filter means included in the apparatus preferably involves a plurality of like filter units B which units are arranged in the housing A where they are supported by the support C so that they intercept air flowing through the housing. The form and construction of the filter units B may, in practice, vary widely depending upon factors such as the service to be performed by the apparatus. The particular form of the invention being illustrated is intended primarily for the filtering of air, for instance, for the removal of dust, or like foreign matter, from the air, in which case the filter units are essentially pads of suitable material through which the air must pass and which act to trap foreign matter such as dust. In the drawings I have illustrated a form of filter unit employing a metallic pad, making it desirable that a medium or agent such as oil be added to or employed with the metal pad to catch and hold foreign matter such as dust. Since oil deposited on the metal pads acts to catch and hold dust it will herein be referred to as a filter agent.

The several filter units B are preferably alike and as shown in the drawings each preferably includes a rectangular frame 16 carrying a metallic pad 17. Each frame is shown as including a bottom 18, a top 19 and sides 20. The pad 17 fits in or occupies the opening established by the frame and as shown in the drawings it may be retained in the frame through any suitable means including flanges 21 on the frame parts overlapping the edge portions of the pad. My present invention is in no way concerned with the details of construction or formation of the pad 17 and therefore, I have not illustrated any particular details of this arrangement. It is to be understood that I may, in practice, use any suitable pad. For example, I may use a pad such as is disclosed in Patent No. 2,286,479 issued June 16, 1942.

The support C for the filter units B is mounted in or carried by the housing and supports the units B in the arrangement or relationship provided by the present invention. In general the support C carries the filter units B in a row extending vertically or so that several units are arranged one above the other in substantially vertical alignment. In the preferred arrangement, however, the several units B located one above the other, instead of being in a common plane, for instance a single or common plane normal to the axis of the duct formed by the housing A, are individually pitched or inclined so that the upper edge portions are forward of the lower edge portions or extend into the stream of air, with the result that the lower end portions of the filter units are horizontally offset from the upper end portions thereof. With the filter units B thus pitched or inclined liquids caught thereby or deposited thereon tend to drain toward the upstream side of the filters to finally discharge from the filters at the lower forward or upstream corners thereof rather than passing through he units with the flow of air to be carried beyond the units with the air. In the particular form of the invention illustrated there is an upper filter unit B adjacent the top of the housing A, a lower unit B near the bottom of the housing, and a single intermediate unit. Further, there are two upper units B, that is, there are two units adjacent the top of the housing and arranged side by side and in like manner there are two lower units and two intermediate units, all as clearly illustrated in Fig. 4 of the drawings. It is to be understood of course, that the number of filter units employed one above the other may be varied to extend the filter means to any desired height and likewise, the number of filter units arranged side by side may be varied to extend the filter means to any desired width.

The support C for the filter units involves primarily a plurality of rails spaced apart and carried by the housing A to engage and support the several filter units B so that they are supported in the desired spaced relation and are inclined in the manner above described. In the particular form of the invention illustrated the means C includes lower rails 30 engaged by the lower end portions of the filter units B and upper rails 31 engaged by upper end portions of the units B. The upper and lower rails 30 and 31 extend horizontally between the sides 10 of the housing A, the upper rails being horizontally offset from the lower rails in the direction from which the air flows in order to give the units B the desired inclination, as shown in Fig. 1 of the drawings. The means C may include vertical rails 32 extending between the upper and lower rails 30 and 31 to be engaged by the sides 20 of the frames 16. It will be apparent from the drawings that the several rails of the support C form or present seats against which the frame parts of the units may bear, and they thus provide an effective support for the several filter units B and make it practical to construct the frames of the filter units so that they are light and inexpensive.

The retaining means D serves to releasably hold or retain the units B in or on the support C. In the preferred form of the invention the means D serves to individually retain the units B so that the units can be removed or replaced one at a time, as circumstances require. In the form of the invention illustrated in the drawings the means D is shown as including elements 35 preferably in the form of handles pivotally connected to the frames of the units B and latches 36 supported from the rails of the support to hold or cooperate with the handles 35. In the particular case illustrated handles are provided on the top and bottom frame parts 18 and 19 respectively, and project from the front or air receiving sides of the filter units. The latches 36 are shown as spring latches supported from the rails 30 and 31 of the support C and projecting in the same general direction as the handles 35. The latches 36 have hooks at their outer ends that engage and hold the handles 35. When the handles are engaged in the hooks of the latches, as shown in Figs. 1 and 6 of the drawings, the filter units are effectively retained in cooperative engagement with the rails of the support C. When it is desired to release the units B the latches are swung out, allowing the handles to be disengaged from the hooks of the latches thus freeing the units for separation from the support. In practice I provide a resilient pad 38 of rubber or the like between the frame of each filter unit, and its supporting rails, thus affording certain resilience for the filter units and providing seals between the frames of the filter units and the support.

In the preferred form of the invention apron-like partitions 40 extend forward and downward from the lower rails 30 to the adjacent upper rails 31, as clearly shown in Fig. 1 of the drawings. Each partition 40 serves to prevent leakage of air between filter units such as might otherwise occur because of the manner in which the upper and lower ends of adjacent filter units are horizontally offset. Further, the partitions 40 serve to catch fluid draining from the filters and directed from the lower end portion of one filter unit to the upper end portion of the next lower filter unit. In the preferred construction a lip 45 is provided at the forward edge of each partition 40 to form a trough 46 extending horizontally of the structure and serving to conduct fluid caught therein horizontally to discharge adjacent the sides 10 of the housing, thus preventing such fluid from draining from one filter unit over the next lower filter unit and from entering the stream of air flowing through the apparatus.

The means E provided to supply a cleaning or washing fluid to the filter units B preferably involves one or more nozzles 50 supplied with a suitable cleaning fluid from a supply pipe 51. In practice any suitable cleaning fluid or solvent may be used. In the case illustrated where the apparatus is serving as an air filter and where oil coated metallic pads are acting as the filtering bodies, it is advantageous or practical to employ water as the cleaning fluid. I have shown the supply pipe 51 which delivers the water equipped with a main control valve 52 and the water from the pipe 51 is supplied or conducted to the several nozzles 50 by suitable distributing pipes 53. In the particular case illustrated a single nozzle 50 is located somewhat forward of each filter unit B and faces the filter unit so that when water is supplied at a suitable pressure an effective spray is directed onto the filter unit. In practice, a filter or strainer 54 may be included in the line 51 to remove material that might otherwise reach the nozzles 50 and cause clogging thereof.

The means F supplying the filter agent to the pads B is, in the present form of the invention, a spray means operable to spray oil or the like onto the filter units B. As above described, oil distributed on metal pads in units B such as I have described above serves as an effective medium for catching and holding dust or the like and, therefore, may be referred to as a filter agent or medium. The particular form of means F illustrated in the drawings involves a plurality of nozzles 55 arranged to direct sprays of oil onto the sides of the units B that face the stream of air, a reservoir 56 carrying a supply of oil, a feed line 57 from the reservoir to the vicinity of the apparatus hereinabove described, distributor lines 58 extending to the several nozzles 55, a pump 59 receiving oil from the feed line 57 and delivering it to the distributor lines 58, and a prime mover preferably a motor 60 driving the pump 59.

In accordance with the preferred form of the present invention the reservoir 56 is located remote from the other parts of the apparatus so that if a volatile oil or an inflammable filter agent is employed it may be stored at a safe location. The several nozzles 55 are spaced and arranged so that as the filter agent is supplied thereto they operate to distribute such agent over the filter units B, causing the filter units to be effectively drained or coated in the desired manner. It will be understood that in practice the pump 59 may be a suitable mechanical pump driven by the motor 60 to feed the oil or filter agent to the nozzles in the desired quantity and under the desired pressure.

The catch basin G is preferably located in the housing A on the floor or base 11 beneath the several filter units B so that fluids, whether cleaning fluids or filter agents draining from the filter units or dripping from the means E and F, are caught. The catch basin is preferably a shallow tray-like structure and in practice may be provided with a drain 65 equipped with a suitable trap 66, if desired.

The control system H provided by the present invention involves, primarily, a control valve 67 in the supply pipe 51 of means E and a control switch 68 for the motor 60 of means F. The control system preferably includes a control circuit that is an electric circuit that governs the action of the valve 67 and the switch 68 and is such as to periodically open the valve and operate the switch so that at suitable time intervals the means E is operated, followed by operation of the means F, it being preferred that the means E operate at spaced intervals of time and only long enough to effectively wash the filter units B, and that the operation of means F follows that of means E after a suitable period of time has elapsed during which the filter units have had time to dry. Means F operates to deliver a fresh or needed supply of filtering agent such as oil to the units B.

In the preferred form of the invention the electrical system involves, generally, a timer T which may involve a continuously operating motor 70 driving a cam 71 controlling valve 67 and a cam 72 controlling switch 68. A power line L energizes the control system through a main control switch 75. Lines 76 and 77 extend from switch 75 to motor 60, the switch 68 being connected in the line 76 and being directly operatively coupled with the cam 72. The valve 67 is an electrically operated valve, being under the control of a solenoid 80 connected between a branch 76ᵃ of line 76 and line 77. A control switch 81 is connected in the branch line 76ᵃ to control solenoid 80 and is directly operatively coupled with the cam 71. The motor 70 of the timer T is coupled with the lines 76 and 77 so that it runs constantly when the main switch 75 is closed. The cam 71 is such as to close switch 81 when the cam is positioned, as shown in the diagram Fig. 3, under which condition solenoid 80 is energized and valve 67 is open. As the cam continues to operate the switch 81 is opened following which cam 72 closes switch 68, causing the means F to operate. Closing of switch 68 energizes motor 60 so that oil is drawn from the reservoir 66 and delivered to the nozzles 55.

The control system preferably further includes thermal safety means acting to minimize fire hazard. In the preferred form of the invention the thermal safety means includes a a control acting to positively cut out the means F so that oil cannot be delivered to the apparatus and means serving to open the means E so that a spray of water is constantly delivered in the apparatus. The thermal means governing the means F may including a thermostat 90 located in a suitable position in the apparatus and controlling the circuit to motor 60. In the drawings the thermostat 90 is shown at the entrance of housing A so that if the temperature in the housing becomes excessive the thermostat functions, opening the circuit to the motor 60.

The thermostatic control for the means E is shown as involving a by-pass connection 91 around valve 67, which by-pass connection includes a valve 92 equipped with a spring 93 normally tending to open it and with a fusible link 94 normally holding the valve closed. The structure just described and shown in Fig. 2 is intended merely as an example of a form of control that may be used in carrying out the invention.

From the foregoing description it will be apparent that I have, by my present invention, provide a simple, practical, yet highly effective arrangement and relationship of parts such as the housing, filter units and the support for the filter units. Furthermore, it will be apparent that the means provided for supplying washing fluid such as water to the filter units is such that the filter units may be effectively flushed or washed out at suitable intervals to remove accumulated material caught by the units and, further, it will be apparent that the means provided for supplying the filter agent or oil serves to effectively reestablish the desired condition in the filter units after the washing operation. The control system of the present invention serves to periodically wash and then reestablish the filter units. In practice by suitably governing the action of the timer T the washing and reestablishing operations may be performed at any suitable intervals and it will be apparent that through the design of the cams 71 and 72 these operations may be extended over any suitable periods of time and may be related in any suitable manner.

Having described only a typical preferred form and application of the invention I do not wish to be limited or restricted to the specific details herein set forth, but wish to reserve to myself any variations or modifications that may appear to those skilled in the art and fall within the scope of the following claims:

Having described my invention, I claim:

1. Apparatus of the character described including, an air duct, a filter in the duct, means delivering water to the filter including a control valve, means spraying oil onto the filter including a nozzle, a pump supplying oil to the nozzle, and a motor driving the pump, and control means including a switch controlling the valve, a switch controlling the motor, and a timer controlling the switches.

2. Apparatus of the character described including, an air duct, a filter in the duct, means delivering water to the filter including a control valve, a thermally controlled by-pass around the valve, means spraying oil onto the filter including a nozzle, a pump supplying oil to the nozzle, and a motor driving the pump, and control means including a switch controlling the valve, a switch controlling the motor, and a timer controlling the switches.

3. Apparatus of the character described including, an air duct, a filter in the duct, means delivering water to the filter including a control valve, means spraying oil onto the filter including a nozzle, a pump supplying oil to the nozzle, and a motor driving the pump, control means including a switch controlling the valve, a switch controlling the motor, and a timer controlling the switches, and a thermally controlled cutout for the motor.

4. Apparatus of the character described including, an air duct, a filter in the duct, means operating a fluid through a cycle including a sprayer directing the fluid onto the filter, and a control intermittently interrupting operation of said means including a control valve controlling flow of the fluid, a control circuit governing operation of the valve, a preset timer controlling the circuit to operate the valve at predetermined time intervals and including a switch and a rotating cam operating the switch, and drive means operating the timer continuously.

5. Apparatus of the character described including, an air duct, a filter in the duct, means operating a fluid through a cycle including a sprayer directing the fluid onto the filter and a power driven pump circulating the fluid, and a control intermittently interrupting operation of said means including, a control circuit governing operation of the pump, a timer controlling the circuit, and a continuously operating power means driving the timer continuously.

6. Apparatus of the character described including, an air duct, a filter in the duct, means delivering a cleaning agent to the filter including a nozzle, a supply duct delivering the cleaning agent to the nozzle, and a valve controlling flow through the supply duct, means delivering a filter agent to the filter including a spray nozzle, a supply pipe delivering the cleaning agent to the spray nozzle, and a power driven pump delivering the cleaning agent to the supply pipe, and a single control system controlling both of said means to periodically clean the filter and apply the filter agent thereto including, independent operators for the valve and the pump, and a timer controlling the operators so they operate successively.

7. Apparatus of the character described including, an air duct, a filter in the duct, means delivering a cleaning liquid to the filter including, a nozzle and supply means delivering cleaning liquid to the nozzle, means delivering a filter agent to the filter including, a spray nozzle, a reservoir carrying a supply of filtering agent, and a power operated fluid circulating means receiving fluid from the reservoir and delivering it to the said spray nozzle, and a single control system controlling the said supply means and said power operated means so they operate in a predetermined sequence to effect periodic cleaning of the filter and application of the filter agent thereto.

8. Apparatus of the character described including, an air duct, a filter in the duct, spraying means directing fluid onto the filter including, a nozzle directed toward the filter, a catch basin receiving fluid draining from the filter, a pump supplying fluid from the basin to the nozzle, a motor driving the pump, and a control for the pump including, a control circuit to the motor, a preset timer governing the control circuit, and a drive continuously operating the timer.

9. Apparatus of the character described including, an air duct, a filter in the duct adapted to pass air, spraying means directing fluid onto the filter including, a nozzle directed toward the filter, a catch basin receiving fluid draining from the filter, a pump suplying fluid from the basin to the nozzle, a motor driving the pump, and a control for the pump including, a control circuit to the motor, a constantly operating timer normally controlling said circuit to intermittently open it, and a thermally responsive means controlling said circuit to open it when the duct becomes overheated.

10. Apparatus of the character described including, an air duct, an air filter in the duct, spraying means directing fluid onto the filter including, a fluid handling nozzle directed toward the filter, a catch basin receiving fluid draining from the filter, a pump supplying fluid from the basin to the nozzle, a motor driving the pump, and a control for the pump including a switch controlled circuit to the motor, a thermally responsive means governing the circuit, a timer intermittently interrupting the circuit, and a drive continuously operating the timer.

11. Apparatus of the character described including, an air duct, a filter in the duct, spraying means directing fluid onto the filter including, a fluid handling nozzle directed toward the filter, a reservoir below and spaced from the duct, a pump supplying fluid from the reservoir to the nozzle, a motor driving the pump and a control for the pump including, a switch controlled circuit to the motor, a timer governing the circuit, and a drive continuously operating the timer.

12. Apparatus of the character described including, an air duct, a filter in the duct, spray means directing fluid onto the filter, and a control intermittently interrupting operation of the spray means including, a catch basin receiving fluid drained from the filter, a power driven pump circulating fluid received from the basin, a control circuit governing operation of the pump, a timer controlling the circuit, and a continuously operating power means driving the timer continuously, the control system including, switches in circuits to the operators, cams operating the switches, and a motor driving the cams continuously.

13. Apparatus of the character described including, an air duct, a filter in the duct, means delivering cleaning water to the filter including, a water supply line and a contol valve in said supply line, and a normally operating control for the valve including a control circuit, a timer operating the circuit at predetermined intervals, and a thermally responsive emergency unit controlling said circuit and located to respond to heat at the duct.

14. Apparatus of the character described including, an air duct, a filter in the duct, means delivering water to the filter including, a water supply line and a control valve in said supply line, a control for the valve including, a valve operating circuit, and a normally operating timer intermittently interrupting said circuit, and a thermally controlled by-pass around the valve.

RICHARD S. FARR.

REFERENCES CITED

The following references are of record in the file of this patent:

UNITED STATES PATENTS

| Number | Name | Date |
| --- | --- | --- |
| Re. 18,328 | Fedeler | Jan. 12, 1932 |
| Re. 19,507 | Owens | Mar. 19, 1935 |
| 1,746,283 | Reed et al. | Feb. 11, 1930 |
| 1,771,173 | Greene | July 22, 1930 |
| 1,886,777 | Anderson | Nov. 8, 1932 |
| 1,947,447 | Brassert et al. | Feb. 20, 1934 |
| 2,142,423 | Timmis | Jan. 3, 1939 |
| 2,197,004 | Myers | Apr. 16, 1940 |
| 2,217,680 | Haines | Oct. 15, 1940 |
| 2,289,894 | Zuhlke | July 14, 1942 |
| 2,429,265 | Fleisher | Oct. 21, 1947 |
| 2,513,716 | Farr | July 4, 1950 |